Nov. 30, 1943.	J. R. McGEE	2,335,346
SAFETY VALVE
Filed April 22, 1940	2 Sheets-Sheet 1
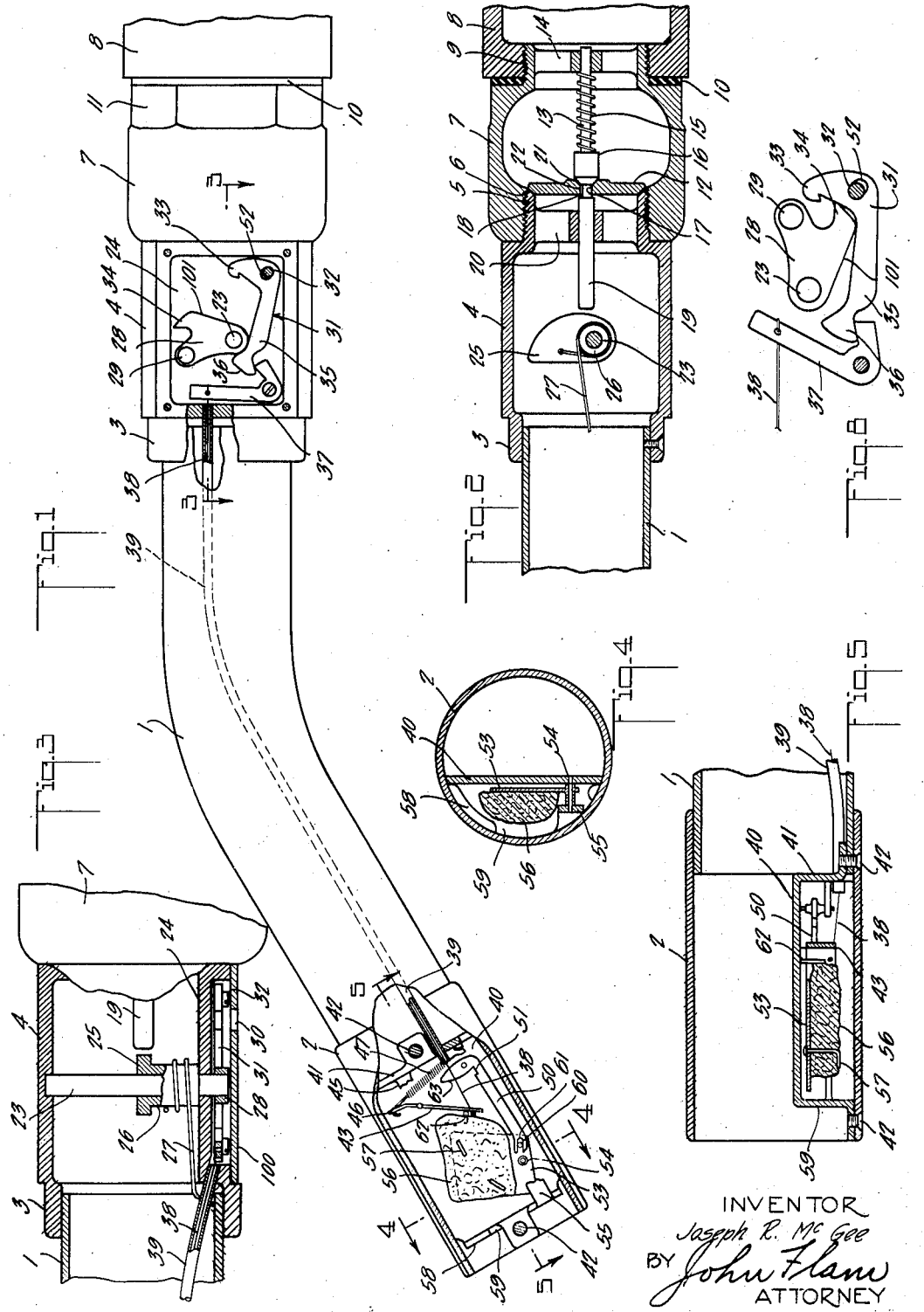
INVENTOR
Joseph R. McGee
BY John Flam
ATTORNEY Nov. 30, 1943.    J. R. McGEE    2,335,346
SAFETY VALVE
Filed April 22, 1940    2 Sheets-Sheet 2
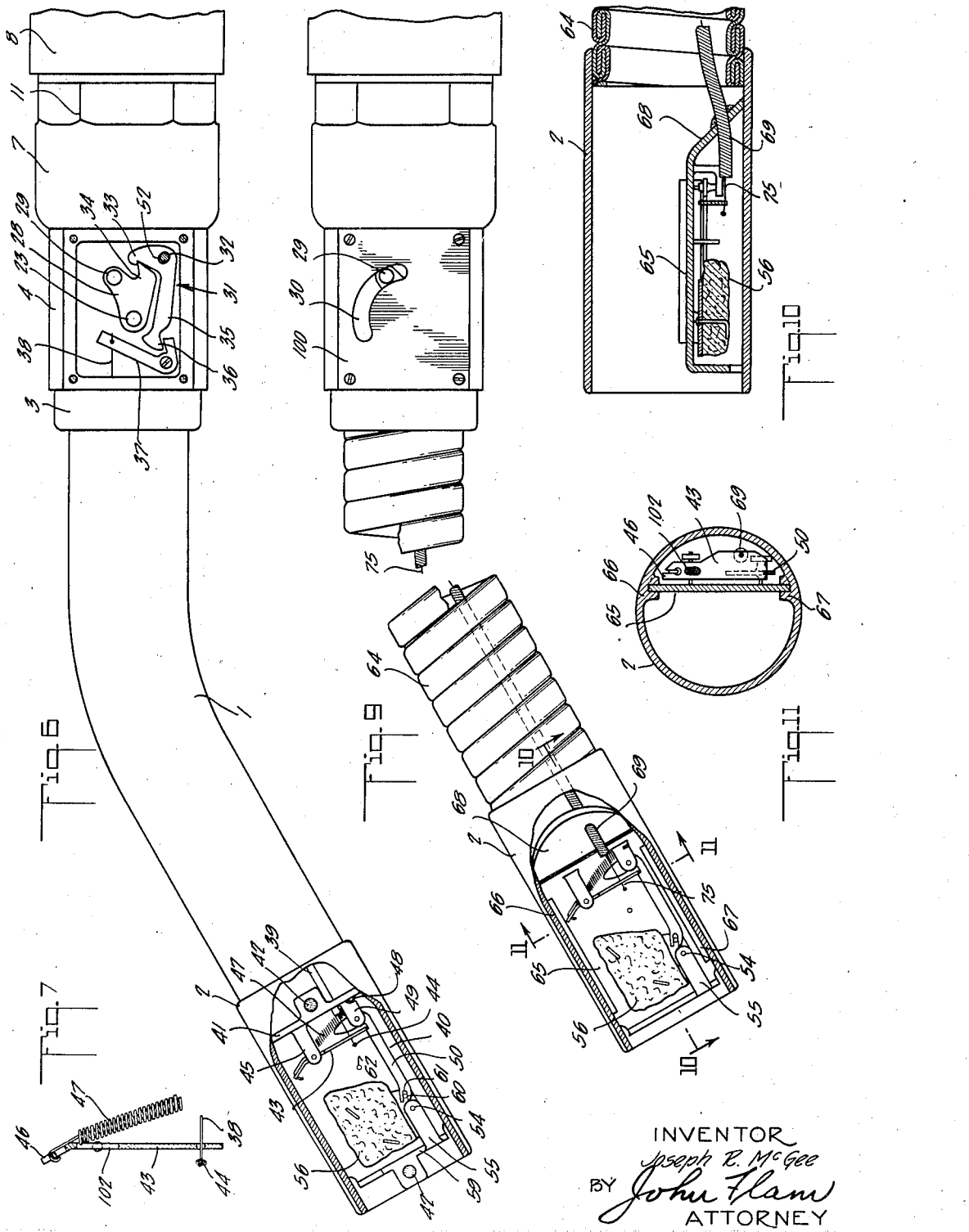
INVENTOR
Joseph R. McGee
BY John Flam
ATTORNEY

Patented Nov. 30, 1943

2,335,346

UNITED STATES PATENT OFFICE 2,335,346

SAFETY VALVE

Joseph R. McGee, Los Angeles, Calif.

Application April 22, 1940, Serial No. 330,947

18 Claims. (Cl. 226—127)

This invention relates to a valve structure and especially to one adapted to control the flow of gasoline through a filling nozzle.

Gasoline dispensers are almost invariably equipped with a hand operated valve located in the conduit that terminates in a filling nozzle. For filling a tank, the attendant places the nozzle into the neck of the tank and then opens the valve. When the desired quantity is delivered, the valve is released, and the nozzle is withdrawn.

There is some danger of spilling gasoline in this process, which embodies a serious fire hazard, especially when the gasoline dispenser is located indoors. It is one of the objects of this invention to ensure against any material loss of gasoline by spilling.

This object is fulfilled by the provision of a supplemental automatically actuated valve, which closes when the tank is filled; and which may also be designed so that the elevation of the nozzle when it is removed from the tank serves to close the automatic valve.

It is another object of this invention to provide a simple, inexpensive and sturdy valve of this character.

In order to control the valve, use is made of a float mechanism, responding to the rise of liquid in the tank. It is another object of this invention to make it possible to use a float mechanism small enough to be placed directly in the nozzle near its discharge end, and yet capable of performing the controlling operations, as for example the release of a trigger mechanism for closing the valve. The walls of the nozzle adequately protect the float, and even extraordinary rough usage of the nozzle can have no harmful effect upon the automatic mechanism.

The float mechanism, intended to respond to a rise in liquid level, is so arranged that it can operate by virtue of gravity to control the valve when the nozzle is inverted; and the nozzle therefore can deliver no liquid until it is pointed downwardly. Accordingly it is still another object of this invention to ensure that the nozzle is properly positioned before the automatic valve may be maintained open.

The valve controlled by the float mechanism is for convenience placed near that end of the nozzle which is remote from the discharge end. The control of the valve is accordingly conveniently accomplished by a pull wire or cable. Often, however, the nozzle is provided with flexible joints, making it possible to adjust the nozzle position. It is still another object of this invention to make it possible to utilize the float control mechanism effectively, in connection with such a flexible nozzle structure, without disturbing the operative connection between the float and the valve.

This invention possesses many other advantages, and has other objects which may be made more easily apparent from a consideration of several embodiments of the invention. For this purpose there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Figure 1 is a side elevation, partly broken away of a delivery nozzle structure embodying the invention;

Fig. 2 is a sectional view through that part of the nozzle structure which carries the valve;

Figs. 3, 4 and 5 are enlarged sectional views taken respectively along correspondingly numbered planes of Fig. 1;

Fig. 6 is a view similar to Fig. 1 but showing the apparatus in valve opening position;

Fig. 7 is an enlarged fragmentary view of an energy storing device and its associated lever utilized in connection with the apparatus illustrated in Fig. 1;

Fig. 8 is a view, mainly diagrammatic, of the releasable latching means and illustrating the mode in which the latching means is rendered effective;

Fig. 9 is a view similar to Fig. 1 but of a modified form of the invention; and

Figs. 10 and 11 are enlarged sectional views taken along correspondingly numbered planes of Fig. 9.

In the form of the invention illustrated in Fig. 1, the nozzle structure is shown as including a tubular member 1 through which liquid is adapted to be discharged. For example, this nozzle structure may be inserted into the neck of an automobile gasoline tank. Its discharge end carries a tubular extension 2 which telescopes over the tubular member 1 and is attached thereto.

The right hand end of the tubular member 1, as shown most clearly in Figs. 1, 2, 3 and 6, is shown as telescoping within the flange 3 of a control case 4. This control case is shown in this instance as being provided with a threaded extension 5 (Fig. 2), the right hand end of which forms a tapered valve seat 6. Threaded on to the extension 5 is a valve body 7. The right hand end of the valve body 7 may be appropriately supported in a continuation 8 of the nozzle as by the aid of the threaded extension 9. In order to render the joints fluid tight, a gasket 10 may be interposed between the member 8 and the valve body 7. Furthermore, as shown most clearly in Fig. 1, the valve body 7 may have a hexagon portion 11 to facilitate the tightening of the threads between the body 7, the casing 4 and the conduit 8. It is intended that a common form of manually controlled valve may be utilized beyond the valve body 7 for manually controlling the flow of liquid through the valve body 7.

The valve body 7 serves to enclose a disk-like valve closure member 12 (Fig. 2). This valve closure member 12 has a tapered surface adapted to be seated upon the seat 6 for interrupting communication between the interior of the body 7 to the nozzle structure. For operating this closure member 12, use is made of a valve stem 13 movable axially with respect to the body 7. The right hand end of the axially movable stem 13 is slidably guided within a spider 14 shown in this instance as formed integrally with the threaded extension 9. A relatively strong compression spring 15 operates upon the shoulder formed by the enlarged portion 16 of stem 13 to urge the closure 12 to the seated position shown.

The valve closure 12 is not rigidly fastened to the stem 13. Instead, it has a central aperture 17 through which the extension 18 of valve stem 13 passes. The extension 18 terminates in an enlarged portion 19 which is guided for axial movement within a spider 20. This spider 20 is shown as formed integrally with threaded extension 5 of the casing 4.

The aperture 17 forms an auxiliary valve seat for the tapered end 21 of the enlarged portion 16. The extension 18 is furthermore provided with a groove 22 forming a restricted discharge port when the auxiliary closure 21 is lifted from the main closure 12. There is a limited free movement of the stem 13 with respect to the closure 12, provided by the spacing between the tapered auxiliary valve closure 21 and the abrupt end surface of the enlarged portion 19.

This arrangement is useful to make it possible to "break" the valve open, even when there is some fluid pressure operating on the right hand surface of the main valve closure 12.

Assuming the valve to be in the closed position illustrated in Fig. 2, a thrust exerted on the left hand end of the portion 19 will first of all cause closure 21 to move away from its seat and fluid or liquid can escape through the aperture 17 from the interior of the valve body 7. This relieves the pressure to the right of the closure 12 which may now be readily moved upon continued movement of the stem 13.

This movement is opposed by the compression spring 15. Unless the valve is held in open position in some manner, the valve would immediately close upon pressure being released from the end of the stem 13.

The operation of opening the valve in the manner described and of releasably holding it in the open position, is accomplished by latching apparatus carried by the casing 4. This mechanism may be manually operated and when latched, it will maintain the valve open until such time as a releasing mechanism is actuated in a manner to be described.

In the present instance the casing 4 rotatably supports an operating shaft 23 (Fig. 3). This shaft extends transversely of the casing 4 and it has an extremity passing through the wall 24 of the casing. The shaft 23 carries the operating cam 25. This cam 25 when rotated in a clockwise direction as viewed in Fig. 2, will engage the end of the extension 19 and urge it toward the right for opening the valve.

Cam 25 is shown as provided with a hub 26. Resilient means are provided for urging the cam 25 to the inactive position of Fig. 2. Thus a torsion spring 27 may be wound around the hub 26. One free end is anchored to the cam 25. The other free end may be anchored to a stationary portion of the apparatus, such as the interior of the tube 1.

In order manually to operate the cam shaft 23, this shaft carries a lever 28 beyond the wall 24. A pin 29 extends from the lever 28 for manual operation. It passes through an arcuate slot 30 (Figs. 3 and 9) formed in a cover plate 100. The arcuate slot 30 in conjunction with pin 29, provides limits for angular movement of the cam 25.

A releasable catch lever 31 (Figs. 1, 3, 6 and 8) is shown as pivotally mounted upon the pin 32 fastened in the wall 24. This lever 31 has a hook 33 adapted to cooperate with a detent 34 integral with the lever 28. The lever 31 has an arm 35 extending toward the left of the pivot pin 32 and is adapted to be engaged by the flat side 101 of lever 28, when this lever 28 is moved to valve opening position. This is indicated in Fig. 8. Thereby the lever 31 is rocked in a counterclockwise direction to position the hook 33 into operative relation with the detent 34. A release of manual force on the pin 29 causes the lever 28 to return to the latched position of Fig. 6.

The operation of releasably latching the valve in open position as just described also ensures the setting of an energy storing means for operating upon the left hand end of the lever 31 to move it to the position of Fig. 1, releasing the detent 34 and permitting the cam 25 to assume the position of Fig. 2. For this purpose the lever 31 is provided with an abutment 36 which acts upon one arm of a lever 37, pivoted by the aid of a pin supported on wall 24. This lever 37 serves to operate a pull wire or cable 38 extending through the tube 1. This wire terminates adjacent the discharge end of the nozzle. In order to guide this pull wire 38, use may be made of a thin tube 39 attached at one end as by solder, in the body 4. At its opposite end the guiding tube 39 is fastened as by the aid of solder or the like in a wall 41 of a supporting member 40 (Fig. 5). This supporting member 40, as shown most clearly in Fig. 4 is inserted within the extension 2. It is held in place within the extension 2 as by the aid of the screws 42.

The left hand extremity of the pull wire 38 is shown as passing through a pivoted lever 43 and is provided with a knob or enlargement 44 (Figs. 6 and 7) which may contact the lower surface of the lever 43 whenever the pull wire 38 is pulled by the lever 37. The lever 43 is shown as pivotally mounted by the aid of an ear 45 (Fig. 6) formed in the end wall 41 of support 40. The short arm 46 of lever 43, as shown most clearly in Figs. 7 and 11 is anchored to a tension spring 47. The opposite end 48 of the tension spring 47 is hooked in an ear 49 (Fig. 6) also formed on wall 41.

Accordingly as the pull wire 38 is pulled by the lever 37 the spring 47 is stretched, thereby storing energy within it. A releasable catch is provided for maintaining the spring 47 in this energy storing position. For example, a latch member 50 may be provided, pivoted on the ear 49 and having a notch 51 adapted to engage the edge of the lever 43. Rotation of the latch 50 in a counterclockwise direction from the position shown in Fig. 6 releases the lever 38 and the spring 47, causing a force to be exerted on the pull wire 38. This in turn causes actuation of lever 37, and thereby a rocking of the catch 31 to release the detent 34. It is to be noted that in the position of Fig. 6 in which the stored energy in the spring 47 is held by the catch lever 50, the direction of the force of the spring 47 is such that it passes quite closely to the axis of lever 43. Accordingly, the torque acting on lever 43 urging it in a clockwise direction is relatively small, and a relatively small force only is required to rock the catch lever 50 to releasing position. In order to permit the spring 47 to pass close to the pivot of lever 43, this lever may be cut away, as illustrated at 102 (Figs. 7 and 11).

Before explaining how the catch lever 50 is moved to the releasing position, a further important feature of the releasing mechanism will now be described.

The lever 31 which maintains the cam 25 in the valve opening position is pivoted on the pin 32 by the aid of an elongated slot 52. The direction of elongation is intermediate the operating ends 33 and 36 of the lever 31. Thus as the lever 28 is moved to valve opening position, the lost motion between the pin 32 and slot 52 (Fig. 8) is taken up by a downward movement of the lever 31 in response to the force exerted thereon by the lever 28. It is only after this lost motion is taken up that the extension 36 can exert a rotative force on lever 37. This force exerts a tension on the pull wire 38 sufficient to cause latching of the lever 43 in the notch 51 of lever 50. However, as soon as detent 34 engages the hook 33, the lever 31 is lifted to the position shown in Fig. 6. This provides a clearance between the extension 36 and the lever 37, relieving the cable or pull wire 38 of all tension. Furthermore, as soon as the catch lever 50 releases the lever 43, considerable kinetic energy is built up by lever 43 before the lever 37 strikes the extension 36. The inertia thus produced is sufficient to release the detent 34, and the valve closes.

The relieving of the tension on the pull wire 38 and the use of a lost motion between lever 37 and lever 31 are of great importance in ensuring that a relatively minor force will be sufficient to return the valve to closed position.

The mechanism for operating the catch 50 may be best disclosed in connection with Figs. 1, 4, 5 and 6.

Thus pivotally mounted upon support 40 is a metal plate support 53. This plate 53 is shown for this purpose as mounted on a pivot pin 54 supported at its opposite ends in the support 40 and in an ear 55 integral with the support. Plate 53 supports a cork float 56 as by the aid of the bent riveted rods 57. This cork float 56 is adapted to be lifted by the rise of the liquid in the fuel tank. It is, however, protected by the extension 2 and the support 40 in such a way that it may be mounted upon its pivot 54 without danger of injury, even when the entire nozzle structure may be dropped inadvertently or otherwise misused.

The liquid from the fuel tank may proceed upwardly through the extension 2 by way of the aperture 58 formed on the end wall 59 of the support 40. This rise is unopposed, because the guide tube 39 also acts as a vent to prevent trapping any air or gas above the liquid level. After it is rocked in a clockwise direction by the rise of the liquid in the extension 2, a pin 60 carried by the metallic member 53 and acting in the slotted extremity 61 of the catch lever 50, rocks this catch lever 50 to the releasing position of Fig. 1.

A pin 62 may be provided for limiting the downward movement of the lever 43 as well as the upward movement of the float 56.

In the process of setting the valve mechanism to open position, the lever 43 is rotated in a counterclockwise direction, and its extremity at the very end of its movement contacts the lower curved surface of the arm 63 formed on the catch lever 50. This ensures a clockwise rotation of the catch lever 50 and a consequent counterclockwise downward movement of the float structure, by the aid of the slot and pin connection at the extremity of the catch 50. In this way it is ensured that the float structure 56 will be urged into position where it will not interfere with proper retention of the lever 43 in the latched position of Fig. 6.

The float 56 is intended as heretofore stated to be operated by the rise of liquid in the extension 2. However, it has sufficient mass so that it will operate to release latch lever 50 when it is rotated in a clockwise direction as the nozzle structure is lifted and pointed upwardly.

Accordingly when the delivery of the desired quantity of gasoline in the tank is completed (even before the level of the liquid may reach the float structure 55), a lifting of the nozzle out of the tank will ensure closing of the safety valve. Therefore even if the operator may inadvertently leave the manual valve open, there is a certainty that no material amount of the highly inflammable liquid can be spilled in the process of hanging the nozzle structure on its appropriate support.

In some circumstances, the nozzle structure is formed of a series of articulated joints or turns rendering it flexible. Such a nozzle structure 64 is illustrated in Fig. 9. Accordingly some provision must be made to maintain the pull wire 75 in proper operative relationship to the various elements of the device, irrespective of the flexure of the nozzle structure.

For this purpose the support 65 (Figs. 9, 10 and 11) for the float mechanism is slidably mounted in the guides 66 and 67, integrally formed within the extension 2. This support 65 has a rear sloping wall 68 having its outer edge in sliding contact with the inner surface of the extension 2. The pull wire 75 in this instance is guided through a flexible tubular member 69, joined as by solder to the wall 68. Accordingly as the nozzle structure 64 is flexed, the guide 69 serves to adjust the position of the support 65 in accordance with the flexure of the nozzle. At the same time the actual linear separation between the spring lever 43 and the releasing mechanism at the valve is left unaltered. In all other respects the mode of operation is identical as in the form previously described. It may be noted, however, that the slope of the rear wall 68 of the support 65 is such as to permit ready passage of gasoline downwardly through the extension 2 without exerting any material downward thrust upon the support 65.

What is claimed is:

1. In a valve control apparatus, means forming a discharge nozzle, a valve spaced from the discharge end of the nozzle, means urging the valve toward closed position, means for opening the valve, releasable means for holding the valve in open position, and mechanism for releasing said releasable means, and carried by the discharge nozzle, comprising a spring operable to store energy, said energy being sufficient to cause said releasable means to operate, a pivoted lever having an arm connected to one end of the spring, said spring having its other end anchored, so that movement of the pivoted lever in one direction serves to store energy in the spring, means for holding the lever in energy storing position, and a member in the nozzle near the discharge end, for freeing the lever, the position of the anchored end of the spring in relation to the pivot of the lever being such that the effective length of the arm with relation to the direction of the spring force increases as the lever moves away from its energy storing position under the influence of the spring.

2. In a valve control apparatus, means forming a discharge nozzle, a valve spaced from the discharge end of the nozzle, means urging the valve toward closed position, means for opening the valve, releasable means for holding the valve in open position, and mechanism for releasing said releasable means, and carried by the discharge nozzle, comprising a spring operable to store energy, said energy being sufficient to cause said releaseable means to operate, a pivoted lever having an arm connected to one end of the spring, said spring having its other end anchored, so that movement of the pivoted lever in one direction serves to store energy in the spring, means for holding the lever in energy storing position, a member in the nozzle near the discharge end, for freeing the lever, the position of the anchored end of the spring in relation to the pivot of the lever being such that the effective length of the arm with relation to the direction of the spring force increases as the lever moves away from its energy storing position under the influence of the spring, and a connection between the lever and the releasable means, said connection serving to operate the lever when the valve is opened, to store energy in said spring, there being lost motion between the connection and said lever.

3. In a valve control apparatus, means forming a discharge nozzle, a valve spaced from the discharge end of the nozzle, means urging the valve toward closed position, means for opening the valve, releasable means for holding the valve in open position, and mechanism for releasing said releasable means, and carried by the discharge nozzle, comprising a spring operable to store energy, said energy being sufficient to cause said releasable means to operate, a pivoted lever having an arm connected to one end of the spring, said spring having its other end anchored, so that movement of the pivoted lever in one direction serves to store energy in the spring, means for holding the lever in energy storing position, a float movably mounted in the nozzle near the discharge end, for freeing the lever, and a connection between the lever and the releasable means, there being a lost motion between the connection and the lever.

4. In a valve control apparatus, means forming a discharge nozzle, a valve spaced from the discharge end of the nozzle, means urging the valve toward closing position, releasable means for holding the valve in open position, and mechanism for releasing said releasable means, comprising a float movably mounted in the nozzle near the discharge end, a spring, a lever adapted by its motion to store energy in the spring, means whereby movement of said releasable means in valve opening direction imparts energy storing motion to said lever, a catch for holding the lever in energy storing position and capable of being rendered ineffective by the float, and a lost motion connection between the lever and the releasable means.

5. In a valve control apparatus, means forming a discharge nozzle, a valve spaced from the discharge end of the nozzle, means urging the valve toward closing position, releasable means for holding the valve in open position, and mechanism for releasing said releasable means, comprising a member movably mounted on the nozzle, a spring device for storing energy, means whereby movement of the releasable means in valve opening direction energizes said device, a catch for holding the spring device in stored condition and capable of being rendered ineffective by movement of the member, and a lost motion connection between the spring device and the releasable means.

6. In a valve control apparatus, means forming a discharge nozzle, a valve spaced from the discharge end of the nozzle, means urging the valve toward closing position, releasable means for holding the valve in open position, and mechanism for releasing said releasable means, comprising a float near the discharge end of the nozzle, a spring mechanism near the float, a connection between the spring mechanism and the releasable means, whereby the spring mechanism is operated to store energy when the releasable means is actuated to valve opening position, and a catch for the spring mechanism, capable of being rendered inoperative upon movement of the float.

7. In a valve control apparatus, means forming a discharge nozzle, a valve spaced from the discharge end of the nozzle, means urging the valve toward closing position, releasable means for holding the valve in open position, and mechanism for releasing said releasable means, comprising a float near the discharge end of the nozzle, a spring mechanism near the float, a connection between the spring mechanism and the releasable means, whereby the spring mechanism is operated to store energy when the releasable means is actuated to valve opening position, and a catch for the spring mechanism, capable of being rendered inoperative upon movement of the float, said connection having a lost motion between it and the spring mechanism.

8. In a valve control apparatus, a conduit, a valve in the conduit having a closure, means urging the closure toward closed position, means for moving the closure to open position, a pivoted catch for said closure moving means, for releasably holding the valve open, and operated upon movement of the valve closure moving means for causing said catch to become active, there being a lost motion in the pivot of the catch, a pull device operated by said catch and released entirely upon completion of the catch operation, by virtue of the lost motion, an energy storing device operated by the pull device, means for holding said energy storing device in energy storing condition, and means for releasing said energy storing device.

9. In a valve control apparatus, a conduit, a valve in the conduit having a closure, means urging the closure toward closed position, means for moving the closure to open position, a pivoted catch for said closure moving means, for releasably holding the valve open, and operated upon movement of the valve closure moving means for causing said catch to become active, there being a lost motion in the pivot of the catch, a pull device operated by said catch and released entirely upon completion of the catch operation, by virtue of the lost motion, an energy storing device operated by the pull device, means for holding said energy storing device in energy storing condition, and means for releasing said energy storing device, comprising a float member supported by the conduit.

10. In a valve control apparatus, a conduit, a valve in the conduit, said valve having a valve seat, and a main closure for the seat, said closure having an aperture therethrough, a stem passing through said aperture and having a limited free movement in an axial direction, an auxiliary closure carried by the stem, and co-operating with the main closure, means for holding the stem in open position, and means for releasing said holding means, comprising a float mechanism.

11. In a valve control apparatus, means forming a discharge nozzle, a valve spaced from the discharge end of the nozzle, means urging the valve toward closing position, releasable means for holding the valve in open position, and mechanism for releasing said releasable means, comprising a tension spring, a lever having one arm connected to the spring, a lost motion connection between the lever and the releasable means, and a latch operating on the lever and maintaining the lever in a position such that the direction of the spring force is close to the pivot of the lever.

12. In a valve control apparatus, means forming a discharge nozzle, a valve spaced from the discharge end of the nozzle, means urging the valve toward closing position, releasable means for holding the valve in open position, and mechanism for releasing said releasable means, comprising a tension spring, a lever having one arm connected to the spring, a lost motion connection between the lever and the releasable means, a latch operating on the lever and maintaining the lever in a position such that the direction of the spring force is close to the pivot of the lever, and a float mechanism for releasing the latch.

13. In a valve control apparatus, means forming a jointed discharge nozzle, a valve spaced from the discharge end of the nozzle, means urging the valve toward closing position, releasable means for holding the valve in open position, mechanism adjacent the end of the nozzle for releasing said releasable means, said mechanism including a connection between the mechanism and the releasable means, a support for the mechanism, movable relatively to the end of the nozzle, and means forming a connection between the support and the valve.

14. In a device of the class described, the combination of a flexible fluid carrying conduit, a control valve at its inlet end, a spring normally holding said control valve in its closed position, manually operable means for setting and latching said control valve in its open position, a float mechanism adjacent to the discharge end of the conduit and comprising a float, a trip lever and latch adapted to be operated by the submergence of the float, means for communicating the movement of the said trip lever to the latch of the control valve, whereby the control valve is then closed by the action of the said spring, said communicating means consisting of a tension member connected between the trip lever of the float mechanism and the latch releasing mechanism of the control valve, said tension member being guided through a coil or tube secured to the conduit, and means for maintaining a constant distance between the control valve mechanism and the float mechanism, said means consisting of a coil or tube connecting the two mechanisms, the float mechanism being slidably mounted and adapted to be given longitudinal movement by the coil or tube for the purpose of compensating for the flexure of the said conduit.

15. In a valve control apparatus, means forming a discharge nozzle, a valve for controlling passage of fluid through said nozzle, means urging said valve toward closed position, releasable means for holding the valve in open position, an energy storing device, a mechanical connection from said device to said releasable means, and actuated solely by the release of energy stored in said device, a catch for maintaining said device in energy storing condition, a movable member near the discharge end of said nozzle and directly engaging said catch for releasing it, and means whereby said energy storing device has, when released, a limited free movement before actuating said releasable means.

16. In a valve control apparatus, means forming a discharge nozzle, a valve for controlling passage of fluid through said nozzle, means urging said valve toward closed position, releasable means for holding the valve in open position, an energy storing device, a mechanical connection from said device to said releasable means, and actuated solely by the release of energy stored in said device, a catch for maintaining said device in energy storing condition, and a movable member near the discharge end of the nozzle and directly engaging the catch for releasing it, said mechanical connection serving to store energy in said device, when the valve is brought to open position.

17. In a valve control apparatus, means forming a discharge nozzle, a valve for controlling passage of fluid through said nozzle, means urging said valve toward closed position, releasable means for holding the valve in open position, and mechanism for releasing said releasable means, comprising a float movably mounted in the nozzle near the discharge end, a spring, a lever adapted by its motion to store energy in the spring, a catch for holding the lever in energy storing position and capable of being rendered ineffective by the float, and means permitting said lever a limited freedom of movement before acting on said releasable means, whereby the force exerted by said lever on said releasable means in response to movement by said spring, is augmented.

18. In a valve control apparatus, means forming a discharge nozzle, a valve for controlling the passage of fluid through said nozzle, means urging the valve toward closed position, a pivoted latch for releasably maintaining the valve in open position, an energy storing device including a pivoted member, means forming a direct mechanical connection between said latch and said member, whereby movement of said latch to valve holding position stores energy in said device, means whereby operation of valve to open position moves the latch to valve holding position, and a movable member near the end of the nozzle for directly controlling said device to cause it to release the latch.

JOSEPH R. McGEE.